Patented June 18, 1940

2,204,673

UNITED STATES PATENT OFFICE 2,204,673

METHOD OF TREATING HYDROCARBONS

Stewart C. Fulton, Elizabeth, N. J., and Thomas Cross, Jr., Baton Rouge, La., assignors to Standard Oil Development Company, a corporation of Delaware No Drawing. Application December 19, 1935, Serial No. 55,234

1 Claim. (Cl. 196—10)

This invention relates to novel methods of treating hydrocarbons, such as by polymerization, cracking, etc.

Broadly, the invention consists in supporting a normally easily volatilizable metal halide catalyst, particularly aluminum chloride, on an active silica gel base in the form of lumps, pills, etc., and then using that catalyst for effecting reactions, such as the polymerization of normally gaseous olefines, e. g., ethylene, propylene, and various butenes, into liquids of the gasoline boiling range, or the cracking of or reforming of normally liquid hydrocarbon fractions, either to produce lower boiling liquids, or to produce liquid fractions having improved properties, such as higher octane number for motor fuel use.

The invention will be thoroughly understood from the following examples, which are given for the sake of illustration only, and from the subsequent description.

Example 1

As one example of a suitable method of preparing the catalyst, the following explanation is given: An aqueous solution of sodium silicate is treated with hydrochloric acid to form a precipitate of silica acid gel, which is then freed from chlorides according to the usual methods (washing with water). The resulting gel is dried, compressed into pill form and heated to exactly the temperature to be used in the polymerization, cracking, or other treating processes and cooled to atmospheric temperature. 2 grams of aluminum chloride are then dissolved in 50 cc. of ethylene dichloride and the solution is poured over 22 grams of the silica gel in the reactor chamber (to be used for the polymerization, etc.). The reactor is then heated while passing a stream of dry nitrogen through it, whereby the solvent (ethylene dichloride) is recovered and any excess aluminum chloride not held in the gel structure is removed. When the reactor reaches the desired reaction temperature, the nitrogen flow is stopped and the catalyst is ready for use.

Example 2

21 liters per hour of a petroleum refinery $C_4$ (butane) cut in gaseous form, which contains a substantial amount of butenes (38.5%), was fed over 22 grams of a catalyst, prepared as described in Example 1, and maintained at a temperature of 235–240° C. About 14.8 grams per hour of liquid polymer in the gasoline range were obtained in the first 2 hours. This amounted to conversion of about 37.0%.

Example 3

Another polymerization run was made similar to Example 2, except that the catalyst was activated with hydrogen chloride. It was found that the polymerization rate of Example 2 could be maintained for longer periods. Removal of the hydrogen chloride caused a gradual drop in polymer production which, on reintroducing the hydrogen chloride, again increased.

Example 4

An East Texas heavy naphtha was passed over a catalyst, prepared as in Example 1, and maintained at about 200–230° C. The liquid product showed an octane number improvement of 9.0 (C. F. R. method), and 2.9% gas was obtained, which consists mainly of isobutane (no unsaturates) as shown by analyses.

Example 5

The procedure of Example 4 was repeated except that the reaction temperature was maintained at 300–350° C., resulting in the production of a lighter gas, a 4% gas loss being obtained for the same octane number improvement as obtained in Example 4. The catalyst still retained ample aluminum chloride at these higher temperatures (300–350° C.) to be highly active.

Instead of using the specially prepared silica gel described above as the support, other suitable materials may be used, such as activated alumina, although silica gel specially prepared as in Example 1 is preferred. It is believed that the aluminum chloride forms a molecular complex with the silica gel.

Also, although aluminum chloride is preferred, other normally solid but easily volatilizable metal halides may be used, for example, ferric chloride.

It is not intended that the invention be limited by any of the examples given, nor by any theories suggested for the operation of the invention, but only by the appended claim in which it is intended to claim all novelty inherent in the invention as broadly as the prior art permits.

We claim:

The process of polymerizing normally gaseous hydrocarbons containing olefins which comprises contacting them at a temperature between 200 to 300° C. with a catalyst prepared by impregnating activated silica gel with aluminum chloride dissolved in ethylene dichloride and heating the mass at a temperature sufficient to drive off the ethylene dichloride.

STEWART C. FULTON.
THOMAS CROSS, Jr.